United States Patent
Zielinski

(10) Patent No.: US 10,890,274 B2
(45) Date of Patent: Jan. 12, 2021

(54) DRYSUIT AND/OR SEMI-DRYSUIT INFLATION VALVE ASSEMBLY ADAPTER FOR PROVIDING A HYDRATION SOURCE TO A DIVER

(71) Applicant: David J. Zielinski, Tampa, FL (US)

(72) Inventor: David J. Zielinski, Tampa, FL (US)

(73) Assignee: David J. Zielinski, Tampa, FL (US)

( * ) Notice: Subject to any disclaimer, the term of this patent is extended or adjusted under 35 U.S.C. 154(b) by 78 days.

(21) Appl. No.: 16/418,052

(22) Filed: May 21, 2019

(65) Prior Publication Data

US 2019/0360613 A1 Nov. 28, 2019

Related U.S. Application Data

(60) Provisional application No. 62/674,815, filed on May 22, 2018.

(51) Int. Cl.

| | |
|---|---|
| *F16L 3/127* | (2006.01) |
| *A41D 13/00* | (2006.01) |
| *A41D 13/012* | (2006.01) |
| *B63C 11/08* | (2006.01) |
| *B63C 11/04* | (2006.01) |

(52) U.S. Cl.
CPC .......... *F16L 3/127* (2013.01); *A41D 13/0002* (2013.01); *A41D 13/012* (2013.01); *B63C 11/08* (2013.01); *A41D 2400/46* (2013.01); *B63C 2011/043* (2013.01)

(58) Field of Classification Search
CPC ... F16L 3/127; A41D 13/0002; A41D 13/012; A41D 2400/46; B63C 11/08; B63C 2011/043
See application file for complete search history.

(56) References Cited

U.S. PATENT DOCUMENTS

| | | | |
|---|---|---|---|
| 4,815,893 A | 3/1989 | Feder | |
| 9,095,178 B1* | 8/2015 | Mankarus | ............ A41D 13/012 |
| 2002/0124294 A1* | 9/2002 | McKenzie et al. | .......................... A41D 13/0002 2/69 |

* cited by examiner

*Primary Examiner* — Tara Mayo-Pinnock
(74) *Attorney, Agent, or Firm* — Shumaker, Loop & Kendrick, LLP

(57) ABSTRACT

Disclosed is a drysuit and/or semi-drysuit hydration assembly including an adapter configured to mate with an inflation valve assembly; a fluid reservoir adapted for positioning internally within a drysuit and/or semi-drysuit; a flexible hose fixedly attached to and passed through a wall of the adapter, the flexible hose having mouthpiece positioned on one end and an opposite end connected to an outlet of the fluid reservoir and being configured to pass fluid from the fluid reservoir to the mouthpiece. Further disclosed is a drysuit and/or semi-drysuit equipped with the hydration assembly.

11 Claims, 16 Drawing Sheets

DRYSUIT AND/OR SEMI-DRYSUIT INFLATION VALVE ASSEMBLY ADAPTER FOR PROVIDING A HYDRATION SOURCE TO A DIVER

TECHNICAL FIELD

The present invention relates generally to the field of drysuits, semi-drysuits, and valve assemblies that are used therewith, and more particularly, to a drysuit (and/or semi-drysuit) valve assembly adapter(s) for providing hydration and/or a hydration source to the drysuit and/or semi-drysuit wearer while in use/diving.

BACKGROUND

Drysuits and semi-drysuits are frequently used in diving. These suits may be used in various types of marine environments including saltwater or freshwater environments at various water temperatures (e.g., bodies of water having sub-arctic temperatures, temperate temperatures, sub-tropical temperatures, and/or tropical waters temperatures).

Drysuits and semi-drysuits are often equipped with inflation valve assemblies 100 such as those depicted in FIGS. 1A-3B, which serve to selectively inflate and deflate the user's suit while diving in order to selectively minimize "squeeze" on one's body during descent and to further mitigate uncontrolled rapid ascent due to excessive buoyancy. As specifically shown in FIGS. 1A-1C, most conventional inflation valve assemblies 100 include a regulator 101 having an inlet 110 for receiving compressed gas and an outlet 102 for passing the compressed gas there through and ultimately into the drysuit/semi-drysuit. As further shown in FIGS. 1A-1C, the inflation valve assembly 100 further includes a cap 120 that mates with and secures the valve assembly onto the drysuit/semi-drysuit. For example and as specifically shown in FIGS. 1A and 1B, the regulator 101 includes an externally threaded neck 103 configured to be received in and passed through opening 204 (FIGS. 2A and 2B) on the drysuit 200. As shown in FIG. 3A, the regulator 101 rests on and is secured to an outer surface 202 of the drysuit 200 by, as shown in FIG. 3B, mating the cap 120 to the regulator 101 by advancing the internally threaded portion 124 of the cap on the externally threaded neck 103 thereby securing the valve assembly 100 on the drysuit 200.

It should be further noted that often during diving, a diver's mouth or throat will become dry, but few, if any, convenient sources of hydration exist that may be easily provided to the diver. Alternatively, a diver may become thirsty and dehydrated on a dive and be in further need of hydration In which Dehydration during diving is often a contributing factor of Decompression Illness (DCI) or Decompression Sickness (DCS). These problems may lead to the diver prematurely terminating the dive and returning to their boat to obtain adequate hydration. In this scenario, the diver utilizes the above mentioned inflation valve assembly to mitigate uncontrolled rapid ascent due to excessive buoyancy when returning to the boat. It should be further noted that U.S. Pat. No. 4,815,893 attempted to address the above mentioned problem by providing a small, externally positioned hydration bladder connected to a diver's mouthpiece, which could be used as a source of hydration to the diver while diving. However, numerous problems exist with the device disclosed in U.S. Pat. No. 4,815,893. For example, the bladder disclosed in U.S. Pat. No. 4,815,893 is a small external bladder connected to the diver's respirator mouthpiece. Because the bladder is placed outside of the diver's suit, the bladder is in direct contact with the body of water leading to the temperature of the fluid contained therein to fluctuate depending on the body of water's temperature. Furthermore, the bladder size is limited and cumbersomely arranged, which leads to both limited liquid volumes that may be consumed by the diver coupled with overall limited mobility due to the external bladder, which disadvantageously encumbers the diver's movement while in use.

SUMMARY

Thus, in view of the above mentioned problems, a need exists to provide a hydration source to divers using the above mentioned drysuit and/or semi-drysuit while diving. In particular, a need exists to provide a hydration source having a large volume for technical, commercial and military divers that is positioned internally (positioned within the suit while diving) within the suit that moderates fluid conditions (e.g., temperature) while concurrently allowing the diver to have unencumbered movement during the dive and preventing entanglement hazards of externally worn hydration packs. In certain aspects, the disclosed hydration source and hydration assembly may also be used with a wet-suit (or in any known thermal protection suit used for diving).

Disclosed herein is a drysuit and/or semi-drysuit hydration assembly including: (a) an adapter configured to mate with an inflation valve assembly; (b) a fluid reservoir adapted for positioning internally within a drysuit and/or semi-drysuit; and (c) a flexible hose fixedly attached to and passed through a wall of the adapter, the flexible hose having mouthpiece positioned on one end for metering/dispensing liquids therethrough and an opposite end connected to an outlet of the fluid reservoir. The flexible hose is configured to pass fluid from the fluid reservoir to the mouthpiece to provide a user with a desired amount of liquid.

Also disclosed herein is a drysuit and/or semi-drysuit equipped with a hydration assembly thereon, which includes (a) the drysuit and/or semi-drysuit; (b) an inflation valve assembly securely fixed to the drysuit; the inflation valve assembly including a regulator and a cap; (c) an adapter of the hydration assembly positioned between and mated/fixed to both the regulator and cap of the inflation valve assembly; (d) a fluid reservoir of the hydration assembly positioned internally within the drysuit and/or semi-drysuit; and (e) a flexible hose of the hydration assembly fixedly attached to and passed through a wall of the adapter, the flexible hose having mouthpiece positioned on one end outside of the drysuit and/or semi-drysuit and an opposite end positioned inside the drysuit and/or semi-drysuit that is connected to an outlet of the fluid reservoir and being configured to pass fluid from the fluid reservoir inside the drysuit and/or semi-drysuit to the mouthpiece outside of the drysuit and/or semi-drysuit.

In yet further aspects, also disclosed herein is an adapter for positioning on a drysuit and/or semi-drysuit, the adapter including a hollow main body having outer and inner planar faces with an outer circumferential wall and an inner circumferential wall positioned there between, the hollow main body including an opening completely extending from the outer circumferential wall through the inner circumferential wall, the opening configured to pass a flexible hose there through, whererin: the outer planar face is configured to mate with a regulator of a drysuit and/or semi-drysuit inflation valve assembly and the inner planar face is configured to mate with a cap of the drysuit and/or semi-drysuit inflation valve assembly such that the hollow main body is configured to be axially aligned with openings of the regulator and cap of the valve assembly to allow for pressurized/compressed gas to flow through the hollow main body into a drysuit and/or semi-drysuit.

Specifically disclosed herein is an adapter configured for attachment to a drysuit and/or semi-drysuit by mating the adapter with a pressurized gas/fluid regulator and cap of an inflation valve assembly. The adapter is further configured to pass liquids for consumption contained within the drysuit and/or semi-drysuit to outside of the drysuit and/or semi-drysuit. The adapter includes (a) a main body having opposing inner and outer planar faces that are connected to one another by an outer circumferential wall and an inner circumferential wall positioned there between, (i) the main body defining a first opening formed along the inner circumferential wall and the inner circumferential wall configured to securely mate with the pressurized gas/fluid regulator of the inflation valve assembly, and (ii) the main body comprising a second opening extending transversely through the main body from the outer circumferential wall through to the inner circumferential wall such that a flexible hose may passed through the first and second openings of the main body and securely attached within the second opening of the hollow main body so that liquids for consumption contained within the drysuit and/or semi-drysuit may be passed through the hollow main body via the flexible hose, and (b) an elongate neck positioned directly on and extending away from the inner planar face of the hollow main body, (i) the elongate neck defining an opening that is at least partially axially aligned and in fluid communication with the first opening of the hollow main body to allow pressurized fluids and/or gases to flow through the adapter (e.g., through the at least partially axially aligned first opening of the main body and the opening within the elongate neck) into the drysuit and/or semi-drysuit, and (ii) the elongate neck is configured to securely engage a cap of the inflation valve assembly for attachment of the adapter to the drysuit and/or semi-drysuit.

In certain aspects, the elongate neck of the adapter includes an externally threaded outer diameter that is configured to be positioned on an outer surface of the drysuit and/or semi-drysuit and advanced through an opening on the drysuit and/or semi-drysuit such that the externally threaded outer diameter of the elongate neck securely mates with an internally threaded portion of the cap of the inflation valve assembly when the cap is advanced in a direction towards the inner planar face of the main body of the adapter.

In certain aspects, the inner circumferential wall of the main body has internally threaded portions configured to securely mate with the pressurized gas/fluid regulator of the inflation valve assembly by advancing externally threaded portions of the regulator within the internally threaded portions of the inner circumferential wall in a direction towards the outer planar face.

In certain aspects, the adapter further includes a sealing ring positioned on the outer planar face of the main body that is configured to prevent externally originating water leaks within the adapter when the adapter is mated with pressurized gas/fluid regulator and is in use with the drysuit and/or semi-drysuit.

In certain aspects, the sealing ring is fitted within a recess on the outer planar face.

In certain aspects, an internal flange connects the elongate neck to the main body such that the elongate neck is concentrically arranged on the main body relative to the inner and outer circumferential walls of the main body.

In certain aspects, the elongate neck is configured to receive the flexible hose therethrough.

In certain aspects, the internally threaded portions of the inner circumferential wall of the main body do not overlap with the second opening of the main body that extends transversely through the main body from the outer circumferential wall through to the inner circumferential wall.

In certain aspects, the main body and elongate neck are annular shaped.

Also disclosed is a drysuit and/or semi-drysuit hydration assembly comprising: (a) an adapter configured to mate with an inflation valve assembly; (b) a fluid reservoir adapted for positioning internally within a drysuit and/or semi-drysuit; and (c) a flexible hose fixedly attached to and passed through walls of the adapter, the flexible hose having a mouthpiece connected to one end for metering/dispensing liquids therethrough and an opposite end connected to an outlet of the fluid reservoir such that the flexible hose is configured to pass fluid from the fluid reservoir to the mouthpiece, wherein the adapter includes: a main body having opposing inner and outer planar faces that are connected to one another by an outer circumferential wall and an inner circumferential wall positioned there between, the main body defining a first opening formed along the inner circumferential wall and the inner circumferential wall configured to securely mate with the pressurized gas/fluid regulator of the inflation valve assembly, and the main body comprising a second opening extending transversely through the main body from the outer circumferential wall through to the inner circumferential wall such that a flexible hose may passed through the first and second openings of the main body and securely attached within the second opening of the hollow main body so that liquids for consumption contained within the drysuit and/or semi-drysuit may be passed through the hollow main body via the flexible hose, and an elongate neck positioned directly on and extending away from the inner planar face of the hollow main body, the elongate neck defining an opening that is at least partially axially aligned and in fluid communication with the first opening of the hollow main body to allow pressurized fluids and/or gases to flow through the adapter (e.g., through the at least partially axially aligned first opening of the main body and the opening within the elongate neck) into the drysuit and/or semi-drysuit, and the elongate neck is configured to securely engage a cap of the inflation valve assembly for attachment of the adapter to the drysuit and/or semi-drysuit.

Also disclosed is a drysuit and/or semi-drysuit equipped with a hydration assembly thereon comprising: (a) the drysuit and/or semi-drysuit; (b) an inflation valve assembly securely fixed to the drysuit and/or semi-drysuit; the inflation valve assembly including a pressurized gas/fluid regulator and a cap; (c) an adapter of the hydration assembly securely positioned on the drysuit and/or semi-drysuit and mated to the regulator and cap of the inflation valve assembly; (d) a fluid reservoir of the hydration assembly positioned inside the drysuit and/or semi-drysuit; and (e) a flexible hose of the hydration assembly fixedly attached to and passed through the adapter, the flexible hose connected to a mouthpiece on one end for metering/dispensing liquids therethrough and connected to an outlet of the fluid reservoir on an opposite end and being configured to pass fluid from the fluid reservoir to the mouthpiece, wherein the adapter comprises: a main body having opposing inner and outer planar faces that are connected to one another by an outer circumferential wall and an inner circumferential wall positioned there between, the main body defining a first opening formed along the inner circumferential wall and the inner circumferential wall securely mated with the pressurized gas/fluid regulator of the inflation valve assembly, and the main body comprising a second opening extending transversely through the main body from the outer circumferential wall through to the inner circumferential wall such that a flexible hose passes through the first and second openings of the main body and is securely attached within the second opening of the hollow main body so that liquids for consumption contained within the fluid reservoir in the drysuit and/or semi-drysuit may be passed through the hollow main body via the flexible hose, and an elongate neck positioned directly on and extending away from the inner planar face of the hollow main body, the elongate neck defines an opening that is at least partially axially aligned and in fluid communication with the first opening of the hollow main body to allow pressurized fluids and/or gases to flow through the adapter (e.g., through the at least partially axially aligned first opening of the main body and the opening within the elongate neck) into the drysuit and/or semi-drysuit, and the elongate neck securely engages the cap of the inflation valve assembly to securely attach the inflation valve assembly and adapter on the drysuit and/or semi-drysuit.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 9A depicts an exploded view of the regulator and cap of the valve assembly with the adapter positioned there between.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1A:
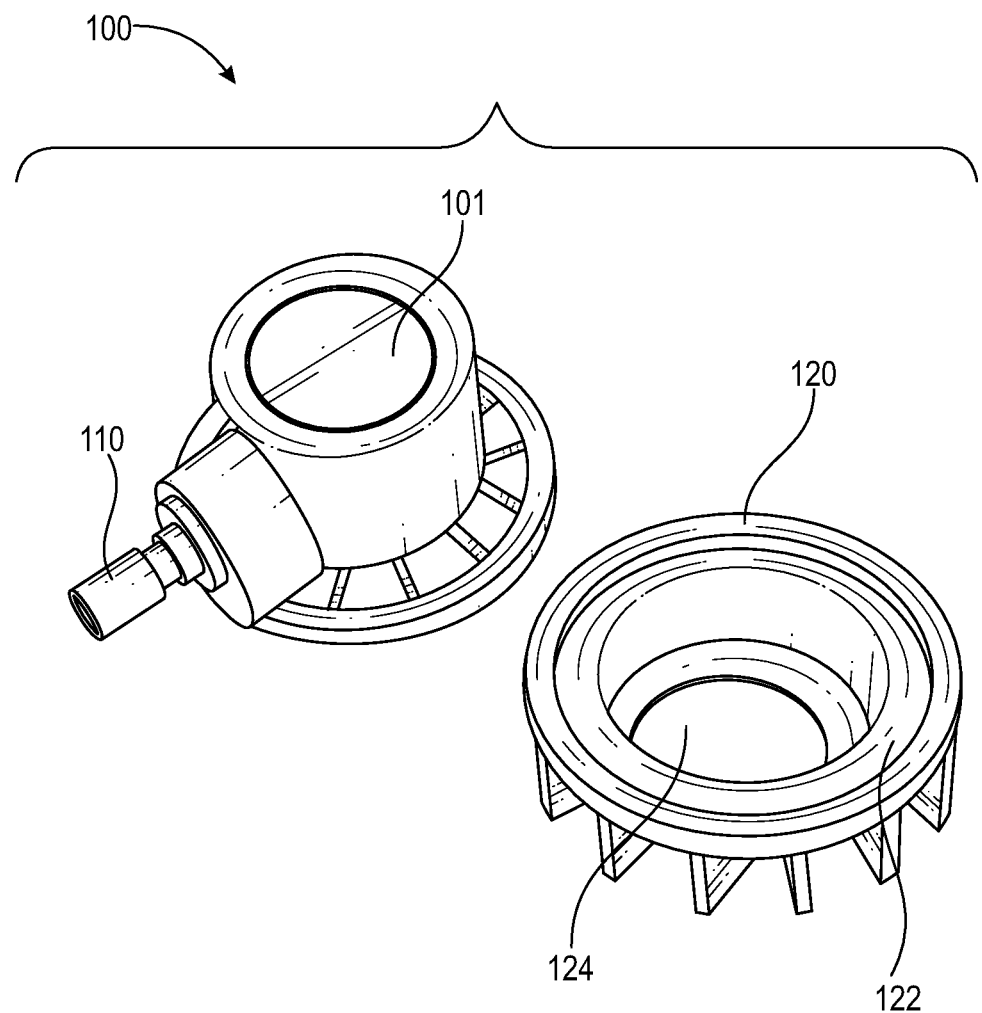
FIG. 1A depicts an inflation valve assembly.
Figure 1B:
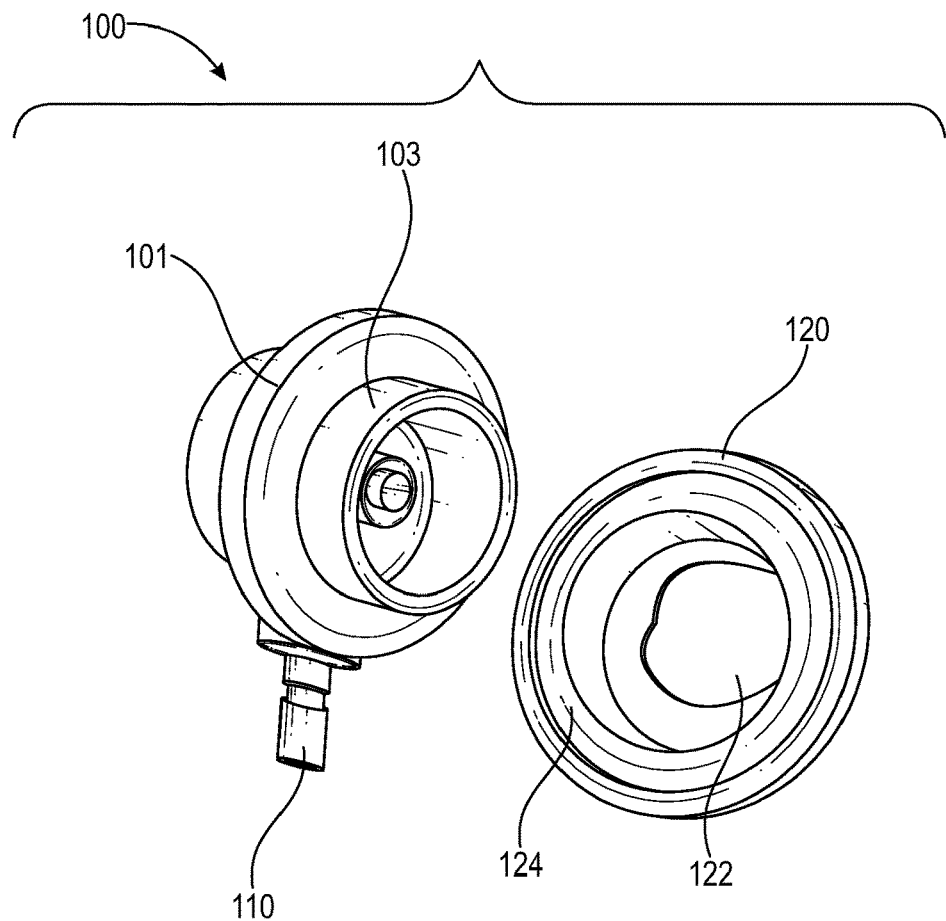
FIG. 1B depicts another view of the inflation valve assembly.
Figure 1C:
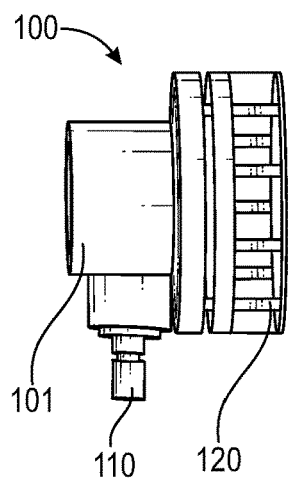
FIG. 1C depicts the regulator and cap of the inflation valve assembly mated to one another.
Figure 2A:
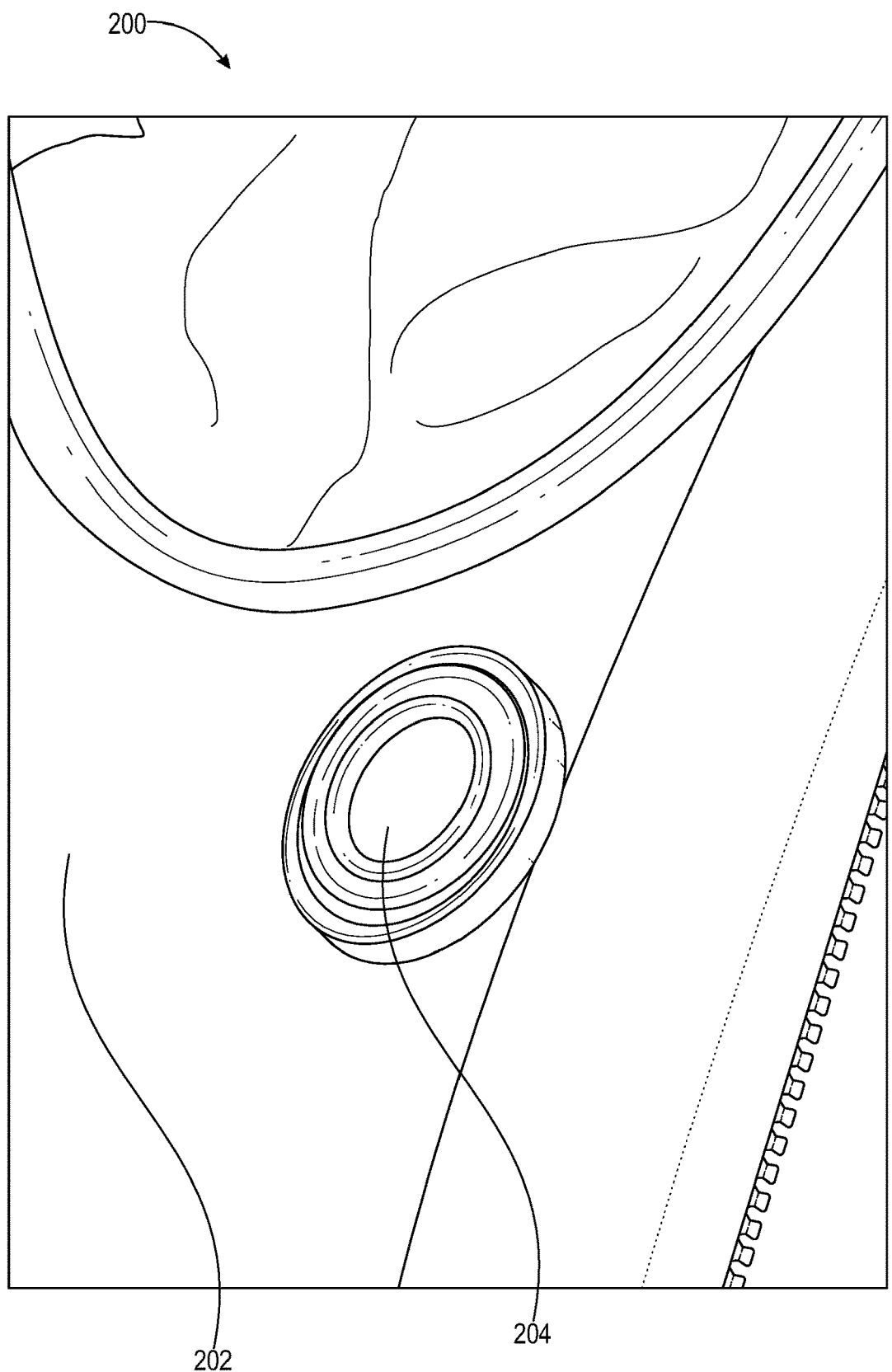
FIGS. 2A and 2B respectively depict an outer surface and an inner surface of an exemplary drysuit having an opening configured to receive and affix the inflation valve assembly on the drysuit.
Figure 2B:
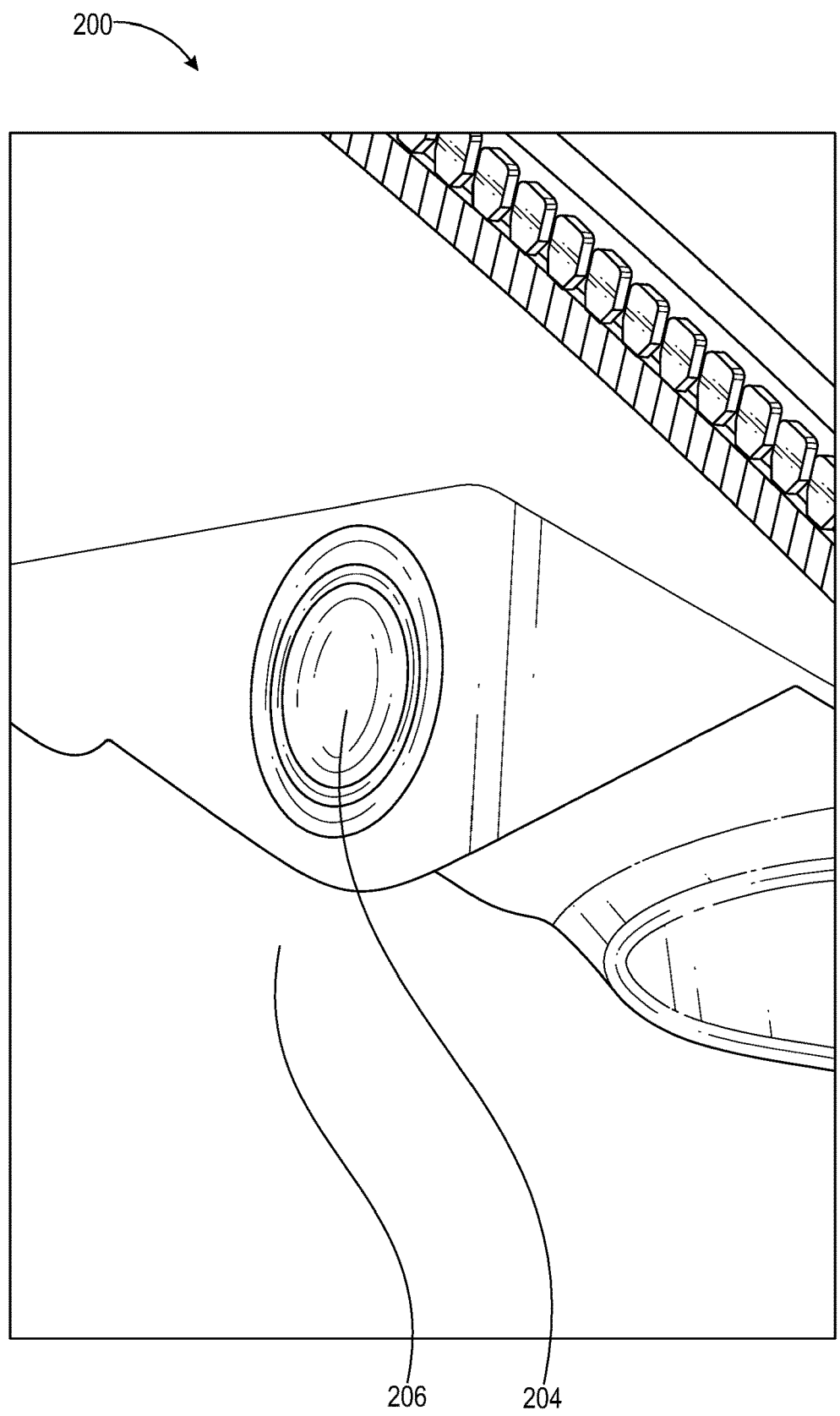
Figure 3A:
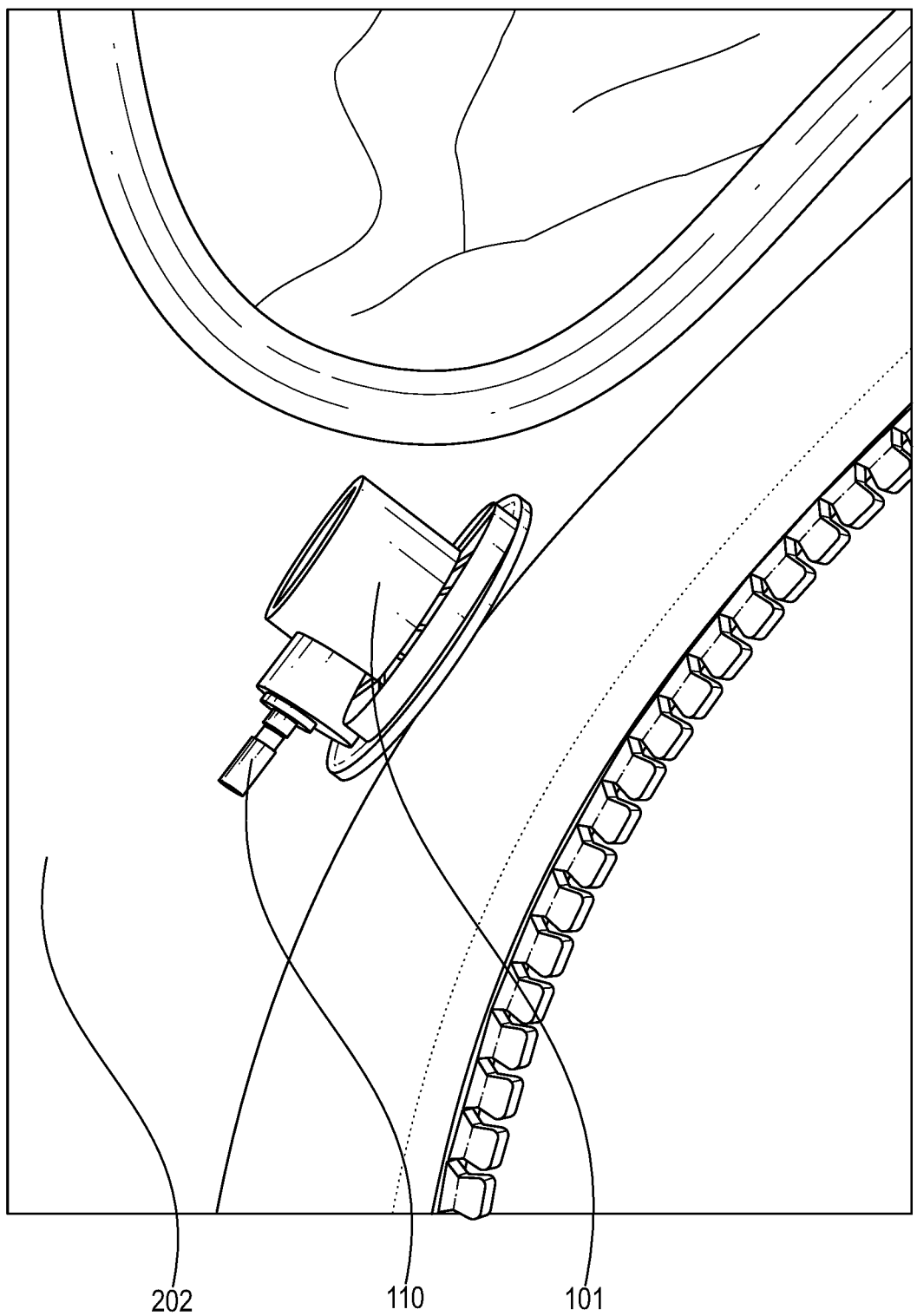
FIGS. 3A and 3B respectively depict the regulator of the inflation valve assembly positioned in the opening on the outer surface of the drysuit and the cap being mated to the regulator on an inner surface of the drysuit.
Figure 3B:
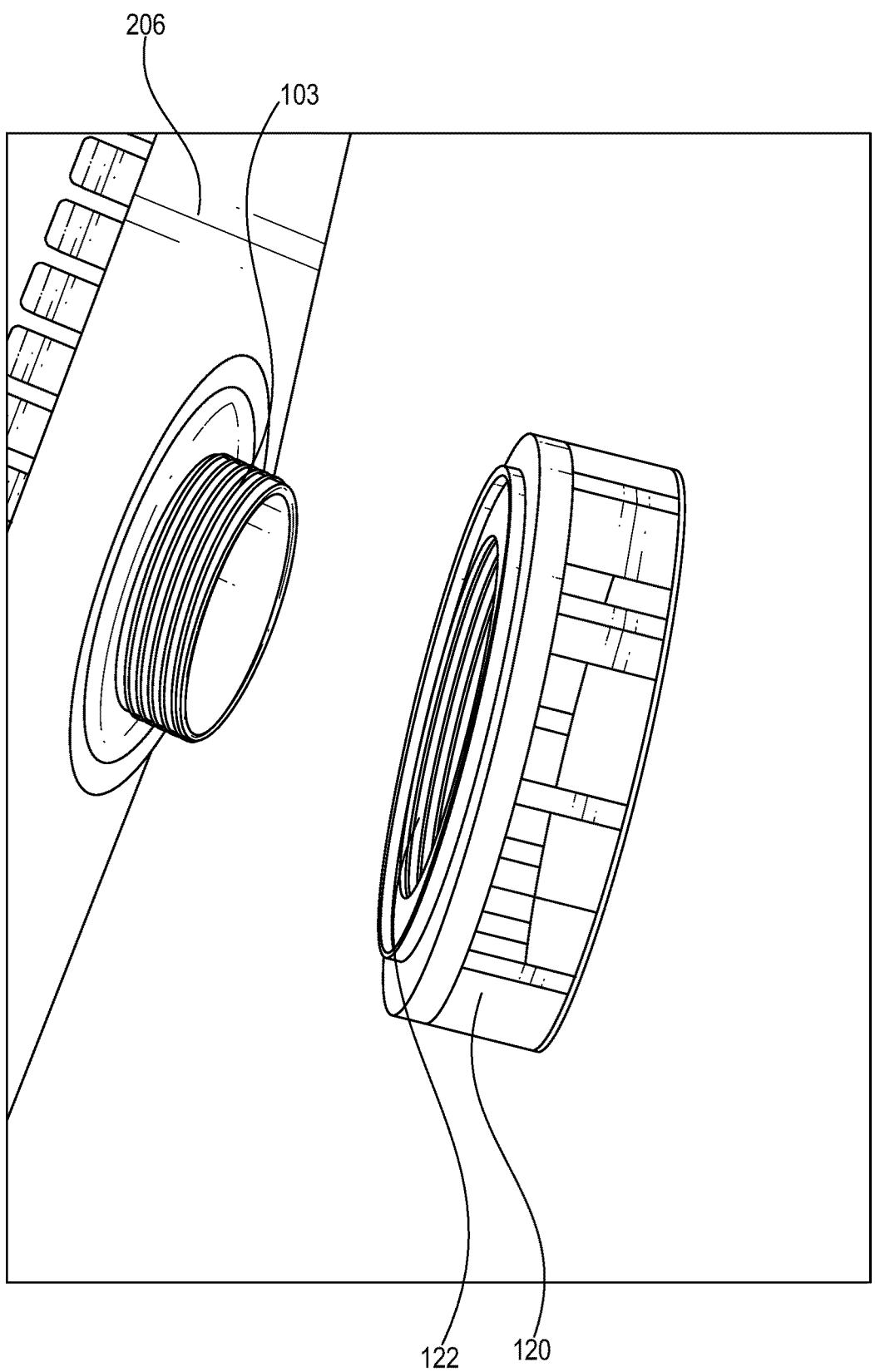
Figure 4:
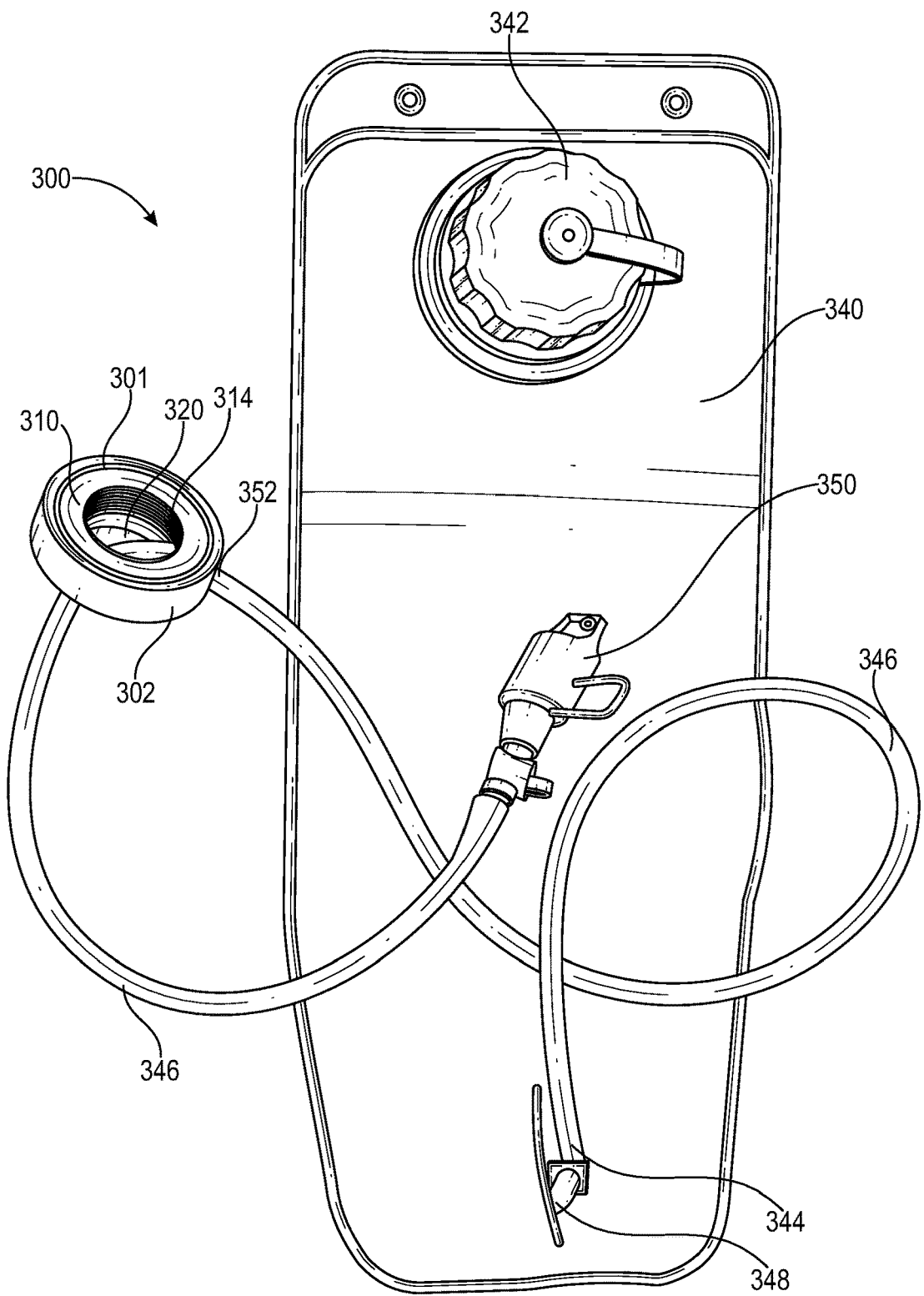
FIG. 4 depicts the hydration assembly including the adapter, mouthpiece, flexible hose, and fluid reservoir, the flexible hose and fluid reservoir being in fluid communication to one another via the flexible hose.
Figure 5:
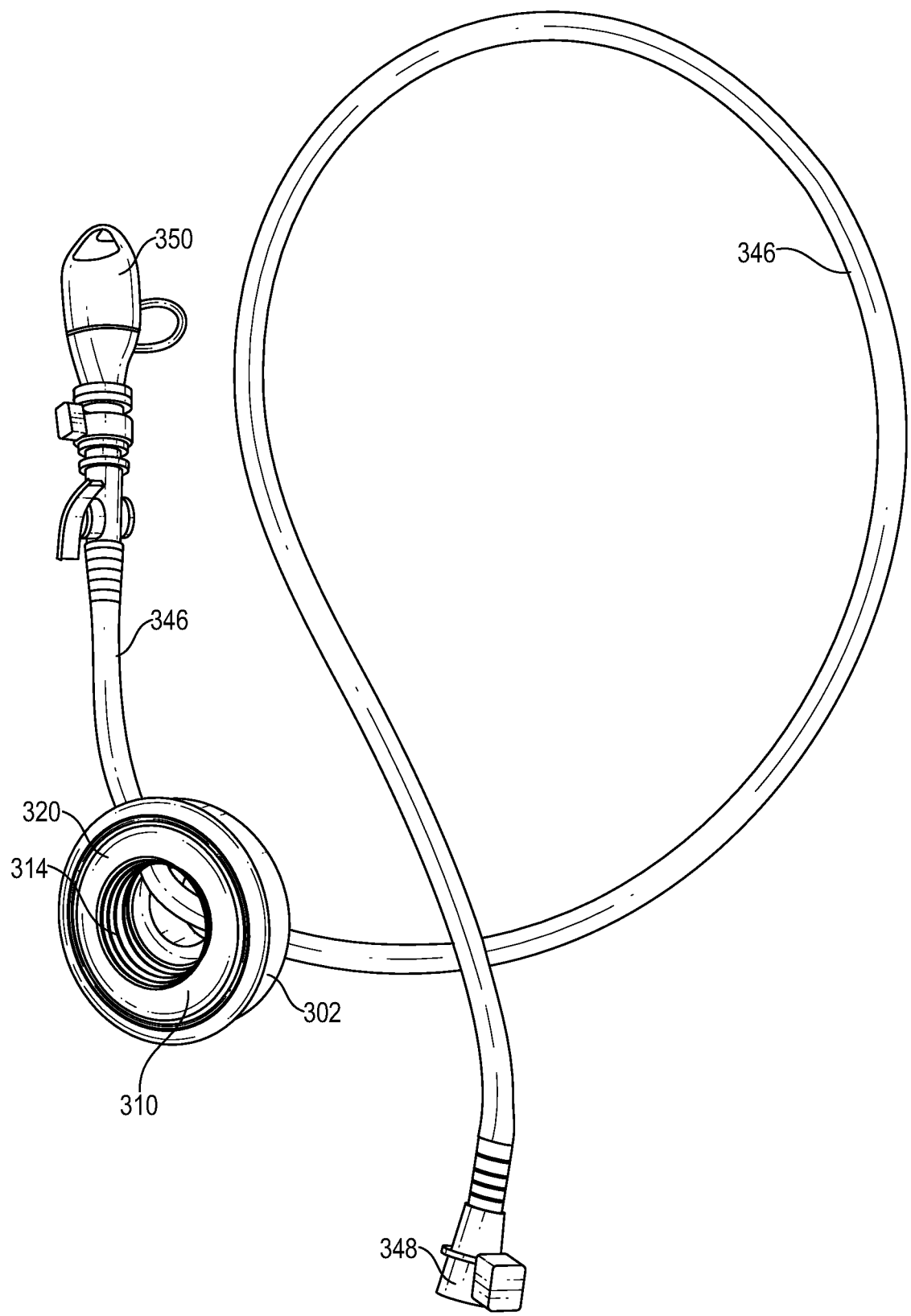
FIG. 5 depicts another view of the hydration assembly omitting the fluid reservoir.
Figure 6:
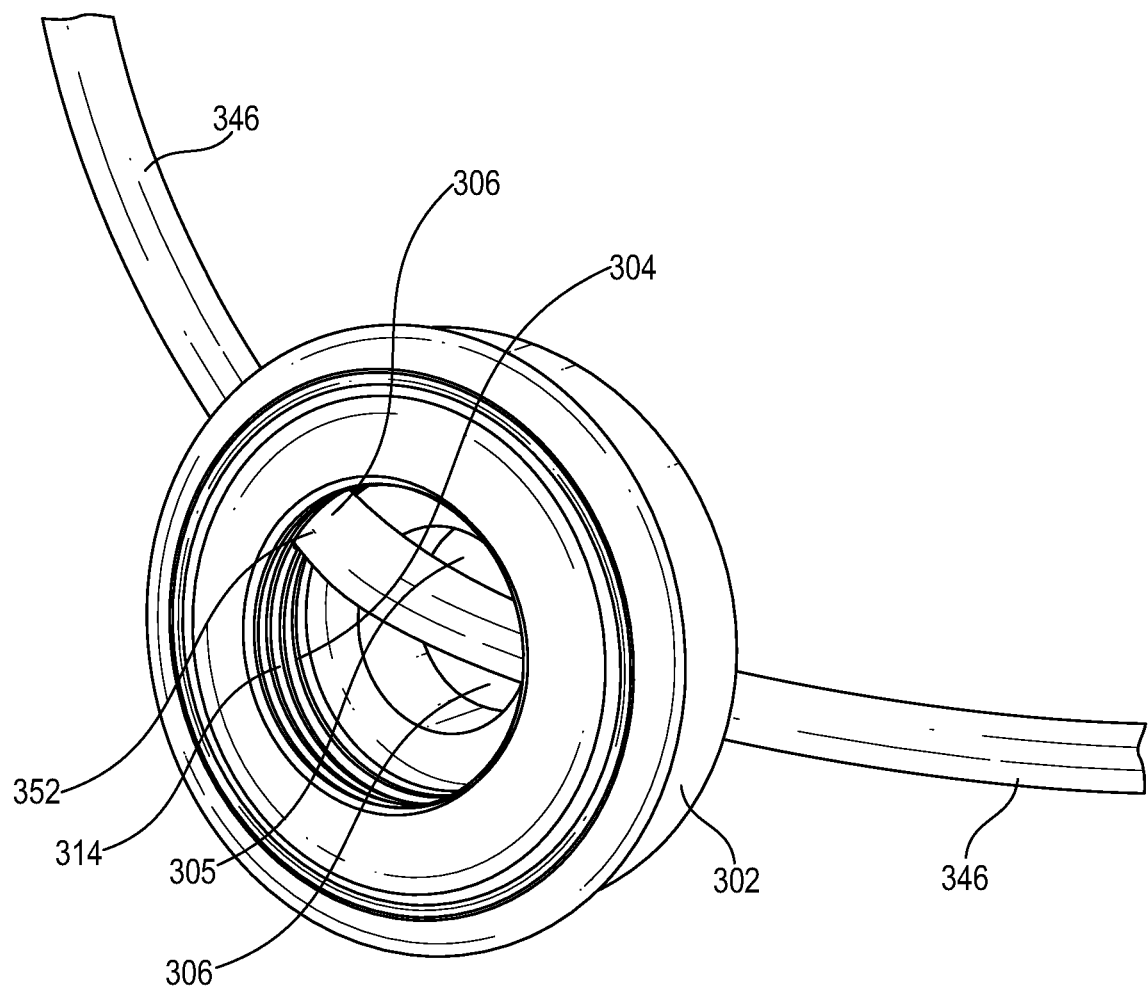
FIG. 6 depicts a perspective view of the adapter with the flexible hose extending through the inner and outer circumferential walls.
Figure 7:
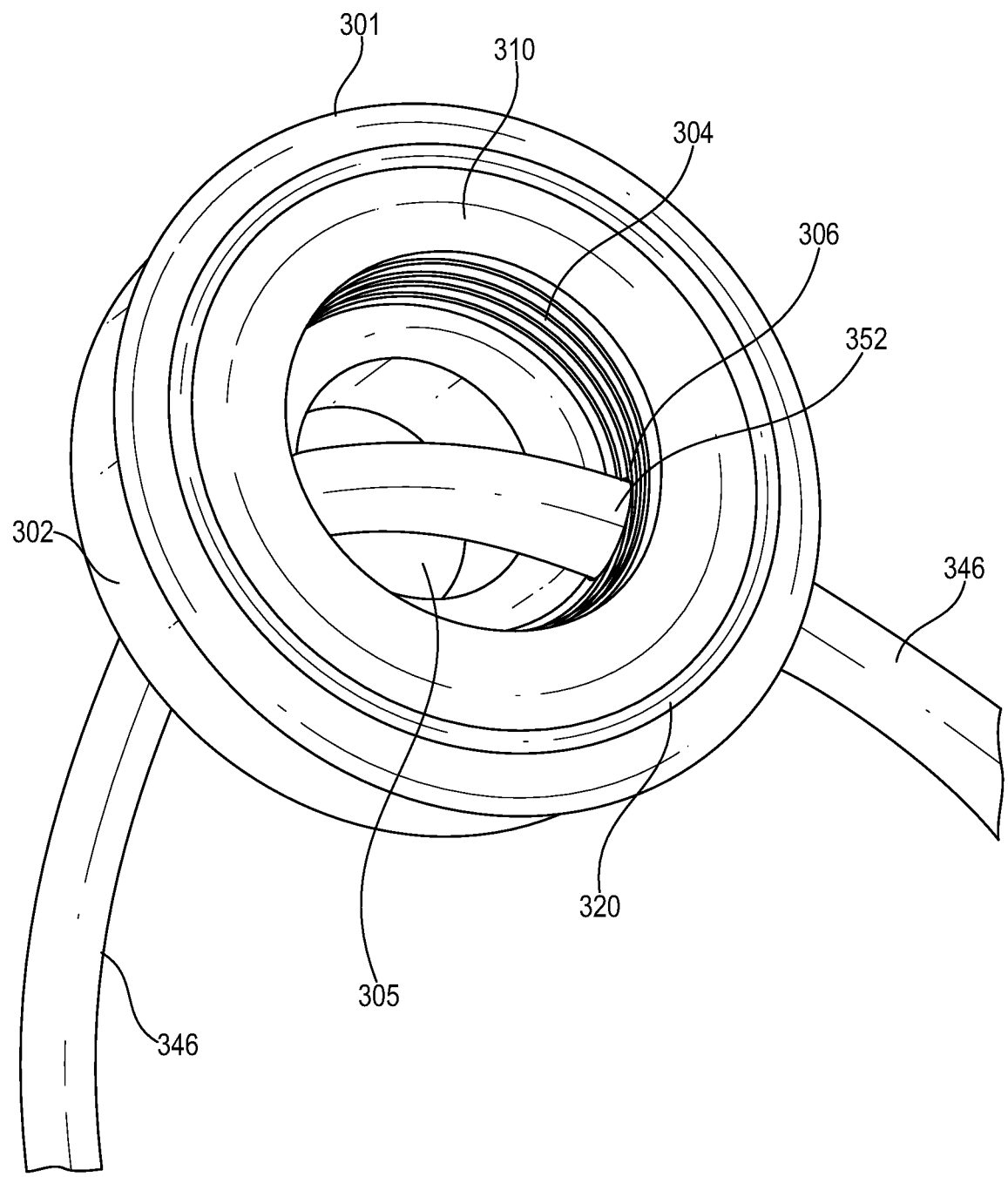
FIG. 7 depicts another perspective view of the adapter with the flexible hose extending through the inner and outer circumferential walls.
Figure 8:
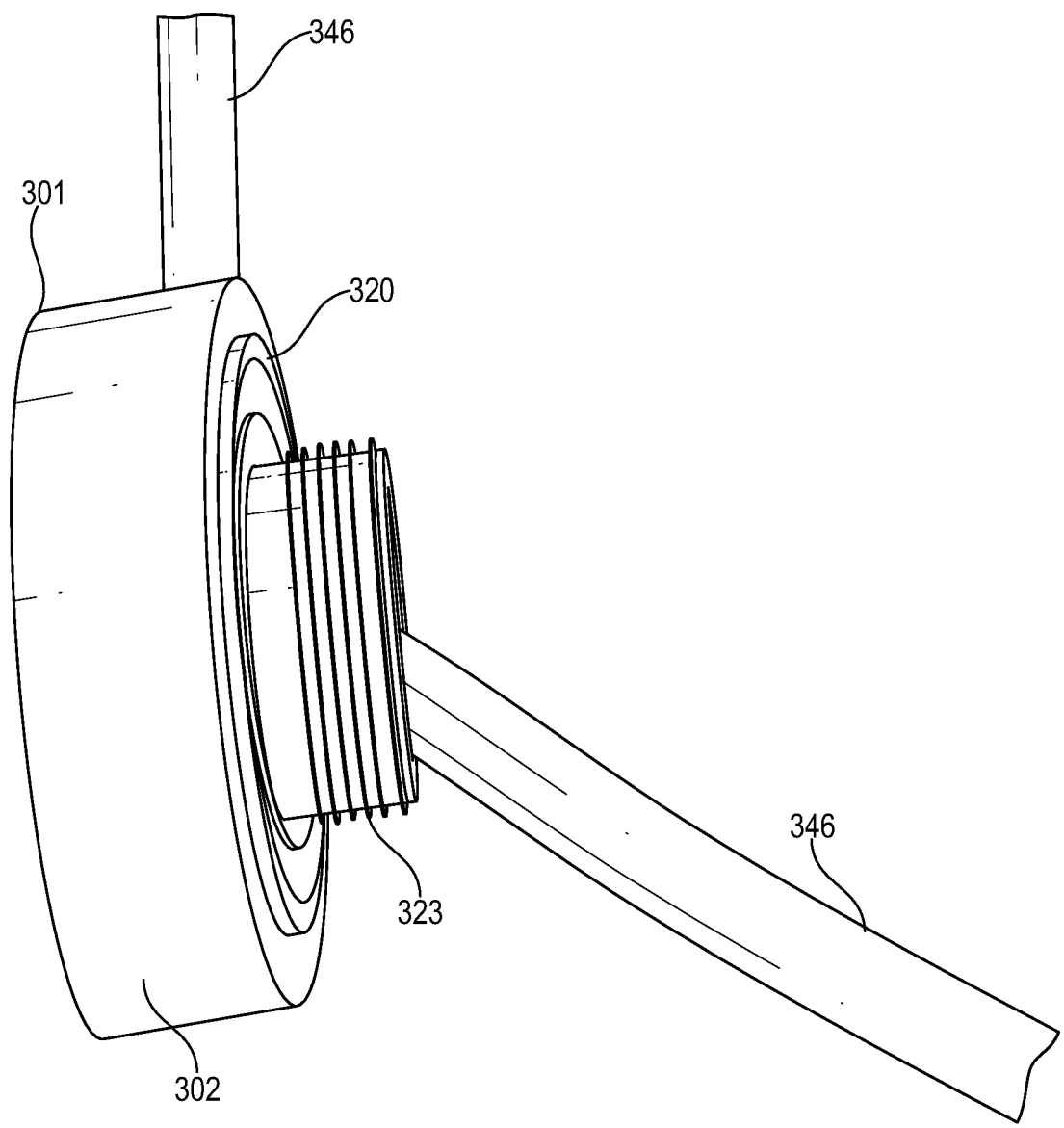
FIG. 8 depicts a side view of the adapter with the flexible hose extending therethrough.
Figure 10:
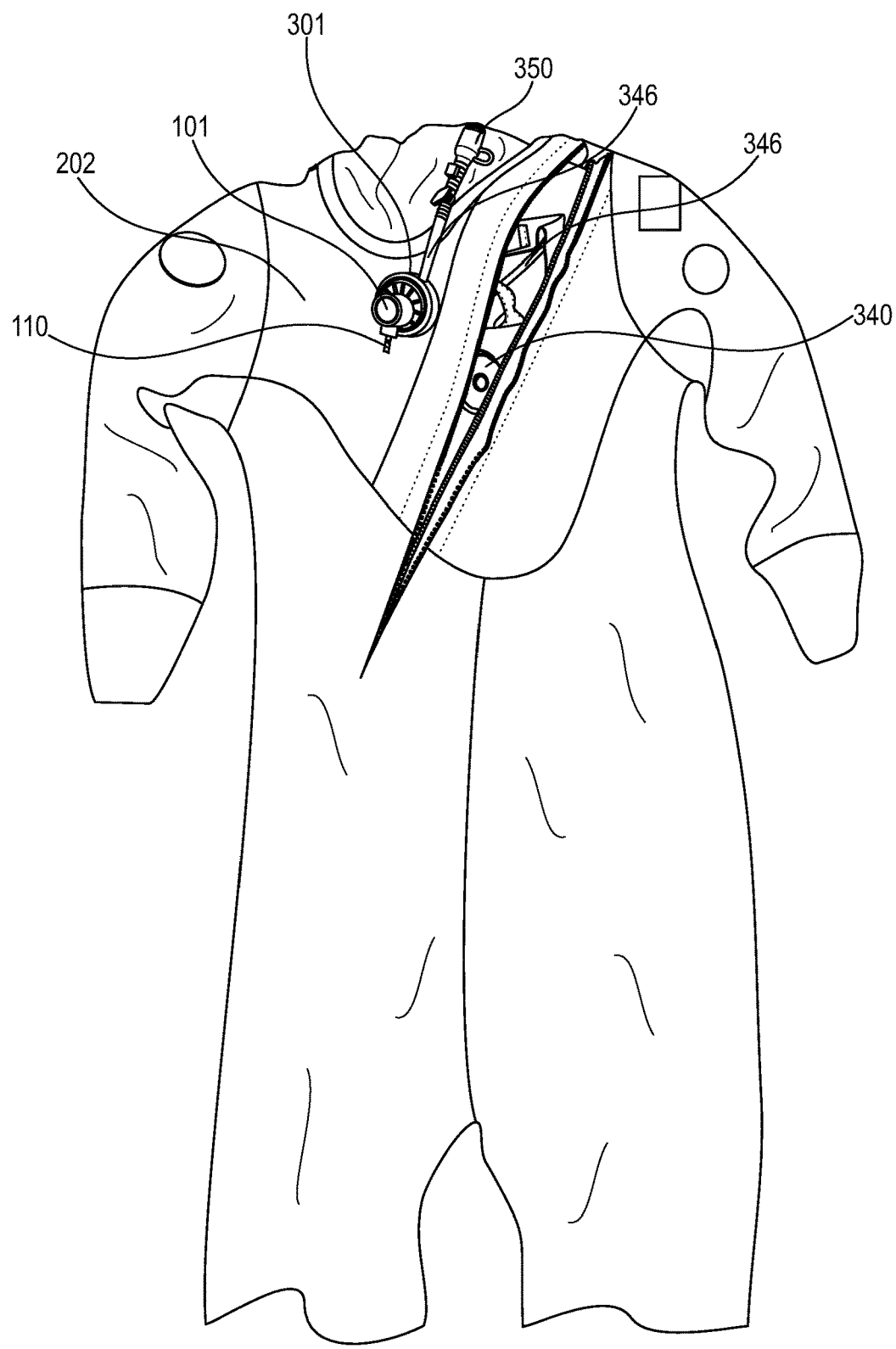
FIG. 10 is a perspective view of the valve and hydration assemblies fully assembled on an exemplary drysuit.

As shown in FIGS. 4 and 10, disclosed herein is a drysuit 200 and/or semi-drysuit hydration assembly 300 that includes an adapter 301 configured to mate with an inflation valve assembly 100; a fluid reservoir 340 adapted for positioning internally within a drysuit 200 and/or semi-drysuit; and a flexible hose 346 fixedly attached to and passed through (i.e., from inside the drysuit to outside the drysuit) the adapter 300. The flexible hose 346 has a mouthpiece 350 for consuming liquids therethrough that is connected to one end of the hose and a second end of the hose is connected to an outlet 344 of the fluid reservoir 340 via hose base 348. The flexible hose 346 is in fluid communication with the fluid reservoir 340 and mouthpiece 350 and is configured to pass fluid from the fluid reservoir to selectively meter fluid through the mouthpiece as desired (e.g., from inside the drysuit to outside the drysuit).

As specifically shown in FIGS. 4-8, the adapter 301 of the hydration assembly 300 includes a main body having opposing outer 310 and inner 320 planar faces with an outer circumferential wall 302 and an inner circumferential wall 304 positioned between the two planar faces that define opening 305 (first opening). The adapter 301 may be formed from an injection molded thermoplastic resin and/or by a millable plastic having sufficient rigidity and characteristics as those further disclosed herein.

Figure 9A:
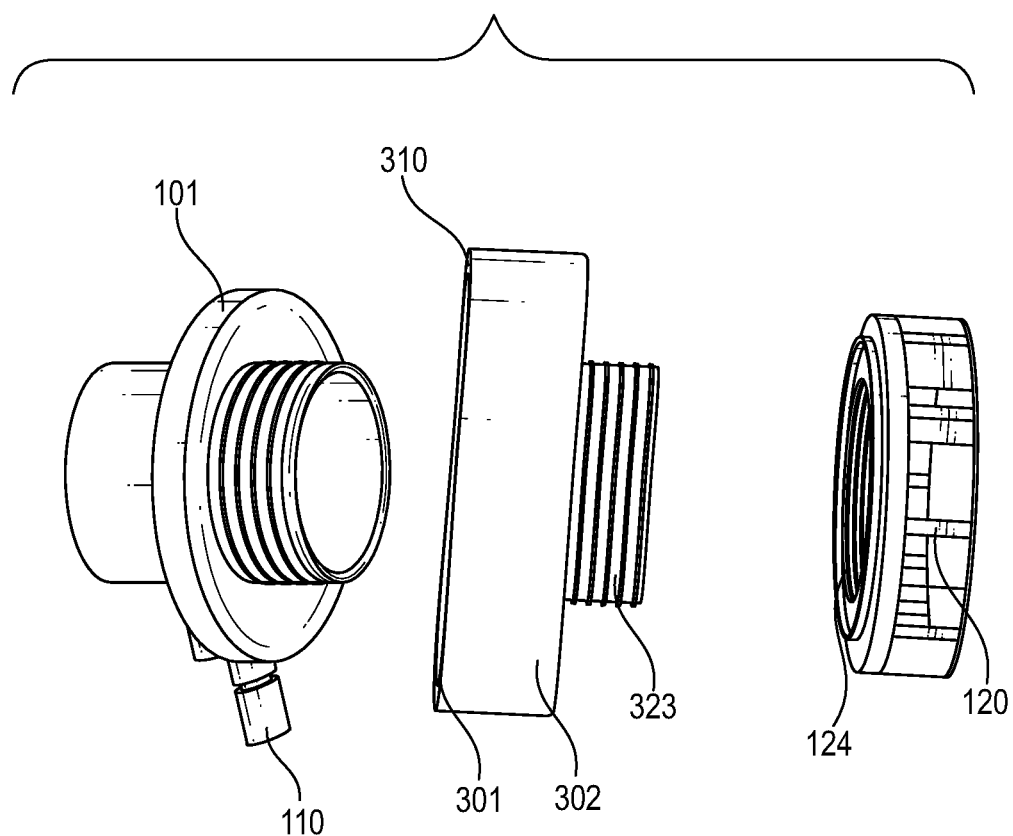
Figure 9B:
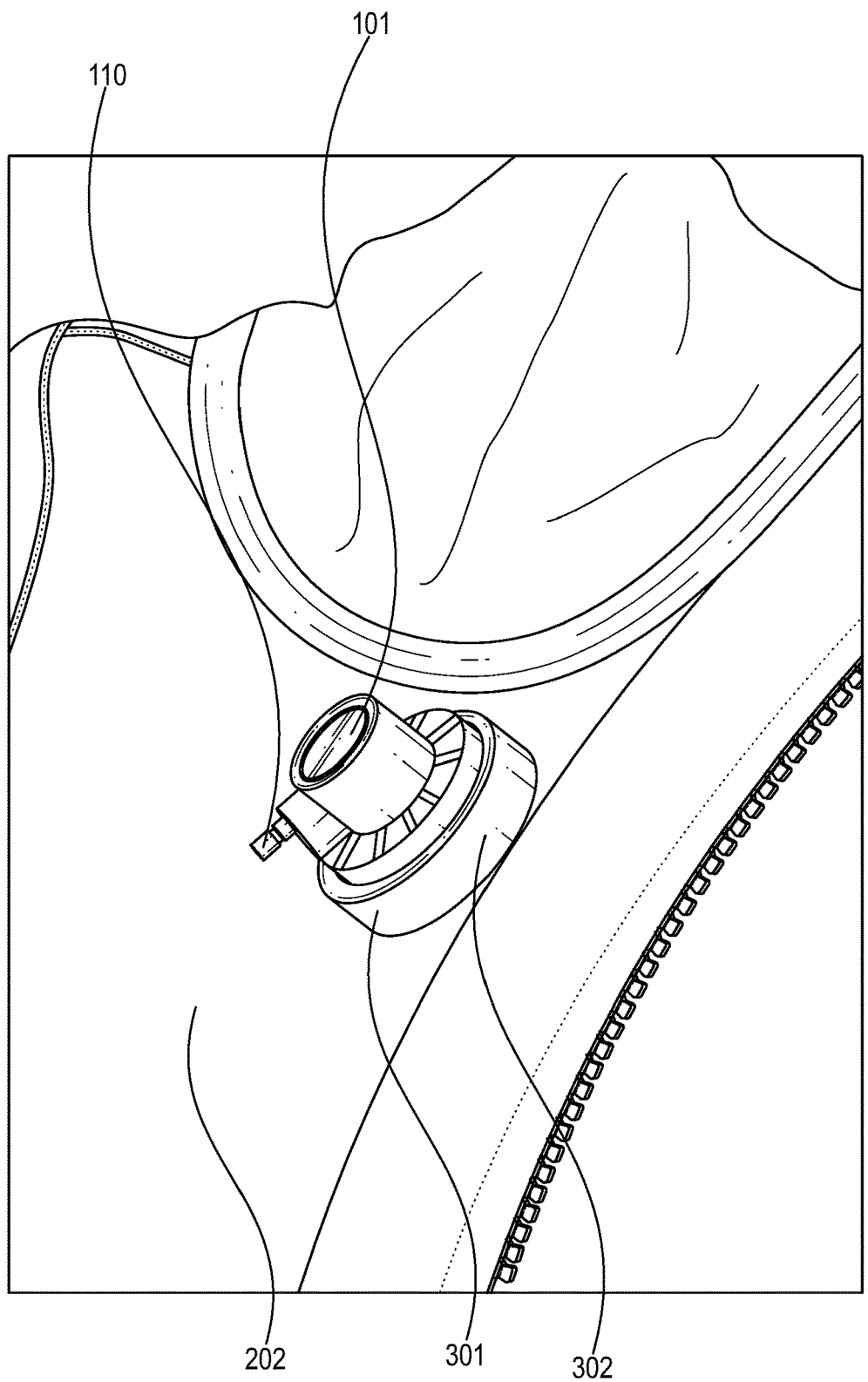
FIG. 9B depicts a perspective view of the outer surface of a drysuit having the regulator mated to the adapter.

The main body of the adapter 301 further includes second opening 306 extending from the outer circumferential wall 302 through the adapter to the inner circumferential wall 304 (transversely through the outer and inner circumferential walls) that is configured to receive and pass a portion 352 of the flexible hose 346 there through. As further shown in FIGS. 9A and 9B, the outer planar face 310 is configured to mate with the regulator 101 of the drysuit 200 and/or semi-drysuit inflation valve assembly 100. More specifically, the inner circumferential wall 304 is internally threaded 314 (internally threaded portion) and is configured to mate with the regulator 101 by advancing the externally threaded neck 103 of the regulator 101 within the internally threaded portion 314 of the adapter 301 in a direction towards the outer planar face 310. For example, FIG. 9A depicts an exploded view of the regulator 101 and cap 120 of the valve assembly 100 with the adapter 301 positioned there between. FIG. 9B depicts a perspective view of the regulator 101 mated to the adapter 301 on the outer surface 202 of the drysuit 201. As shown for example, in FIGS. 4, 6, and 7, in certain additional aspects the outer planar face 310 further includes a recess (e.g., circumferential recess) that receives seal ring 316 therein. When present, seal ring 316 further aids in securely mating and ensuring a watertight fit between the adapter 301 to regulator 101 to further prevent leaks into the drysuit by compensating for expansion/contraction related to temperature fluctuations while diving.

Figure 9C:
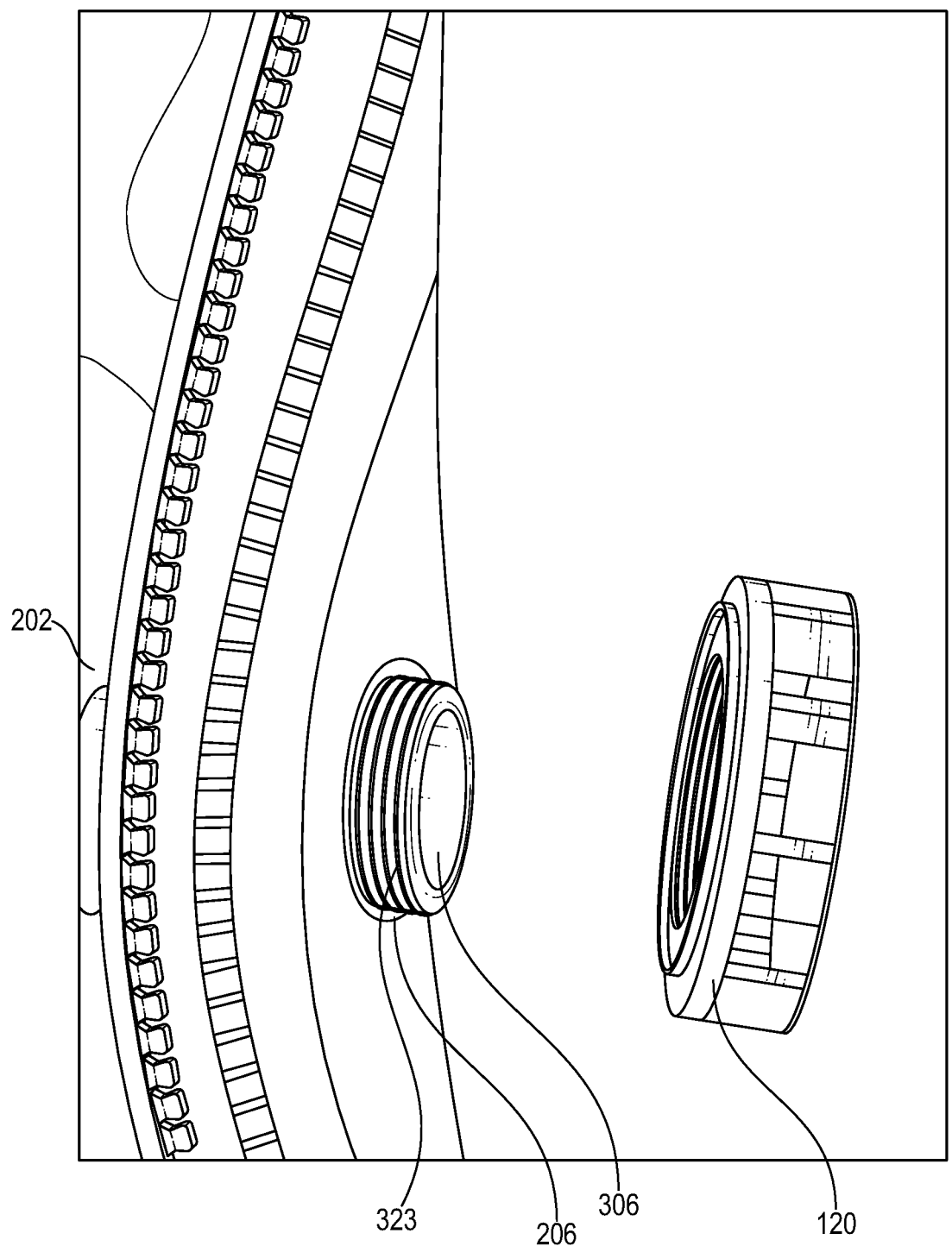
FIG. 9C depicts a perspective view of the inner surface of the drysuit with the cap of the valve assembly in the process of being mated to the adapter.

In certain aspects, the inner planar face 320 is configured to mate with the cap 120 of the drysuit and/or semi-drysuit inflation valve assembly 100 such that the main body is axially aligned with openings of the regulator and cap of the valve assembly (i.e., openings 102, 204, and 305 are aligned) to allow for pressurized gas to flow through the main body into a drysuit and/or semi-drysuit. For example, FIGS. 9A and 9C respectively depict an exploded view of the regulator 101 and cap 120 of the valve assembly 100 with the adapter 300 positioned there between and a perspective view of the inner surface 206 of the drysuit 200 with the cap 120 of the valve assembly in the process of being mated to the adapter 301. More specifically, the adapter 301 includes an externally threaded neck 323 directly connected to and extending away from inner planar face 320 of the adapter. When viewed from top down and as further depicted in FIGS. 6-8, the externally threaded neck 323 and the outer circumferential wall 302 appear to be concentric rings. When mating the adapter 301 to the cap 120 of valve assembly, and as further shown in FIG. 9C, the externally threaded neck 323 of the adapter 301 mates with internally threaded portion 124 of cap 120 to secure the regulator 101, adapter 301 (and hydration assembly), and cap 120 on the drysuit 200. Portions of the flexible hose 346 are fed through and extend into cap opening 122 and further extend through the inner and outer circumferential walls 304, 302 so that a diver may consume fluid from fluid reservoir within the drysuit by application of negative pressure to mouthpiece 350 outside of the drysuit, but otherwise, portions of flexible hose do not interfere with flow of pressurized gas from the regulator 101 into the drysuit via the axially aligned openings 102, 204, and 305.

Figure 11:
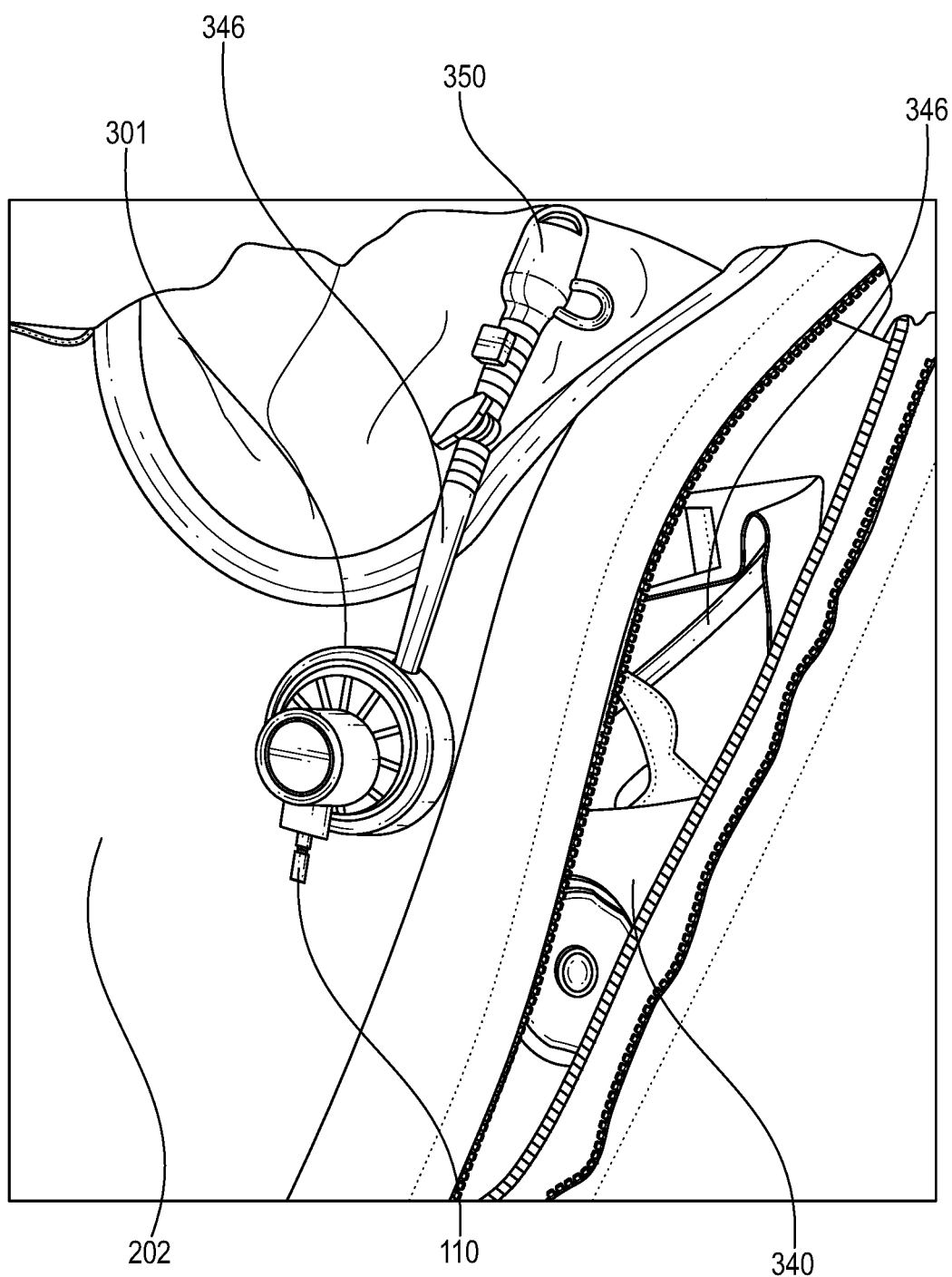
FIG. 11 is a magnified view of FIG. 10.

FIG. 10 is a perspective view of the valve 100 and hydration 300 assemblies fully assembled on an exemplary drysuit 200. As shown in FIG. 10 and again in FIG. 11 (which is a magnified view of FIG. 10), the mouthpiece 350, regulator 101, and adapter 301 are secured on the outer surface 202 of the drysuit when the valve and hydration assemblies are fully assembled and in use, and as further shown in FIGS. 9C, 10 and 11, the regulator cap 120, fluid reservoir, and portions of the flexible hose 346 extending from the fluid reservoir through the adapter 301 are positioned inside the drysuit when the valve and hydration assemblies are fully assembled and in use.

The above mentioned hydration assembly 300 and adapter advantageously overcome existing problems by providing a hydration source to divers while diving in a drysuit and/or semi-drysuit. In particular, they hydration assembly 300 provides a hydration source (fluid reservoir 340) having a large volume that is positioned internally within the suit that moderates fluid conditions (e.g., temperature) while concurrently allowing the diver to have unencumbered movement during the dive.

It is envisioned that different kits including the disclosed individual components and assemblies may be packaged for commercial purposes. For example, a first kit may only include the adapter disclosed herein that is configured to be used with inflation valve assemblies and flexible hose/hydration bladders that are separately obtained. A second kit may include the hydration assembly disclosed herein (i.e., the adapter, the flexible hose, mouthpiece, and fluid reservoir 340). As third kit may include both an inflation valve assembly and the hydration assembly prepackaged together.

In certain aspects, it is further envisioned that the disclosed hydration source and hydration assembly may also be used with a wet-suit (or in any known thermal protection suit used for diving).

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

PARTS LIST

100 Inflation Valve Assembly
101 Regulator (Pressurized Fluid/Gas Regulator)
102 Regulator Opening/Outlet (for providing pressurized/compressed gas to drysuit)
103 Externally Threaded Neck
110 Inlet (Compressed gas Inlet)
120 Cap
122 Cap Opening (axially aligned with regulator opening)
124 Internally Thread Portion (extends along inner diameter of cap and mates with 103)
200 Drysuit
202 Outer Surface of Drysuit
204 Opening (extends from outer surface to inner surface; receive and allows for mating of 101 to 103)
206 Inner Surface of Drysuit (Configured to contact suit wearer)
300 Hydration Assembly
301 Adapter (configured for positioning between and mating to 101 and 120)
302 Outer Circumferential Wall
304 Inner Circumferential Wall
305 Opening That Axially Aligns with Regulator and Cap Openings
306 Opening extending from outer wall to inner wall receives portion of flexible hose 332 therethrough
310 Outer Planar Face of Adapter
314 Internally Threaded Portion (extends from outer face internally within adapter and extends along inner diameter of adapter; mates with 103)
316 Seal Ring (fitted within recess of outer face, substantially flush with in planar surface of outer face and further aids in securing adapter to regulator)
320 Inner Planar Face of adapter
323 Externally Threaded Neck (elongate neck) Extending from Inner Planar Face (configured to Mate With 124)
340 Fluid Reservoir
342 Inlet For Supplying Desired Fluid to Reservoir 340
344 Outlet
346 Flexible Hose In Fluid Communication with Outlet Via Hose Base 348 (at one end of hose)
348 Hose Base 350 Mouthpiece Positioned at Opposite End of Flexible Hose (configured to selectively provide liquid to user) and in Fluid Communication with fluid reservoir 352 Portion of Hose Extending through Inner and Outer Wall of Adapter

What is claimed is:

1. An adapter configured for attachment to a drysuit and/or semi-drysuit by mating the adapter with a pressurized gas regulator and cap of an inflation valve assembly and configured to pass liquids for consumption contained within the drysuit and/or semi-drysuit to outside of the drysuit and/or semi-drysuit, the adapter comprising:
   (a) a main body having opposing inner and outer planar faces that are connected to one another by an outer circumferential wall and an inner circumferential wall positioned there between,
      (i) the main body defining a first opening formed along the inner circumferential wall and the inner circumferential wall configured to securely mate with the pressurized gas regulator of the inflation valve assembly, and
      (ii) the main body comprising a second opening extending transversely through the main body from the outer circumferential wall through to the inner circumferential wall such that a flexible hose may passed through the first and second openings of the main body and securely attached within the second opening of the hollow main body so that liquids for consumption contained within the drysuit and/or semi-drysuit may be passed through the hollow main body via the flexible hose, and
   (b) an elongate neck positioned directly on and extending away from the inner planar face of the hollow main body,
      (i) the elongate neck defining an opening that is at least partially axially aligned and in fluid communication with the first opening of the hollow main body to allow pressurized gases to flow through the adapter into the drysuit and/or semi-drysuit, and
      (ii) the elongate neck is configured to securely engage the cap of the inflation valve assembly for attachment of the adapter to the drysuit and/or semi-drysuit.

2. The adapter of claim 1, wherein the elongate neck comprises an externally threaded outer diameter that is configured to be positioned on an outer surface of the drysuit and/or semi-drysuit and advanced through an opening on the drysuit and/or semi-drysuit such that the externally threaded outer diameter of the elongate neck securely mates with an internally threaded portion of the cap of the inflation valve assembly when the cap is advanced in a direction towards the inner planar face of the main body of the adapter.

3. The adapter of claim 2, wherein the inner circumferential wall of the main body has internally threaded portions configured to securely mate with the pressurized gas regulator of the inflation valve assembly by advancing externally threaded portions of the regulator within the internally threaded portions of the inner circumferential wall in a direction towards the outer planar face.

4. The adapter of claim 3, further comprising a sealing ring positioned on the outer planar face of the main body that is configured to prevent externally originating water leaks within the adapter when the adapter is mated with pressurized gas regulator and is in use with the drysuit and/or semi-drysuit.

5. The adapter of claim 4, wherein the sealing ring is fitted within a recess on the outer planar face.

6. The adapter of claim 5, wherein an internal flange connects the elongate neck to the main body such that the elongate neck is concentrically arranged on the main body relative to the inner and outer circumferential walls of the main body.

7. The adapter of claim 6, wherein the opening of the elongate neck is configured to receive the flexible hose therethrough.

8. The adapter of claim 7, wherein the internally threaded portions of the inner circumferential wall of the main body do not overlap with the second opening of the main body that extends transversely through the main body from the outer circumferential wall through to the inner circumferential wall.

9. The adapter of claim 8, wherein the main body and elongate neck are annular shaped.

10. A drysuit and/or semi-drysuit hydration assembly comprising:
    (a) an adapter configured to mate with an inflation valve assembly;
    (b) a fluid reservoir adapted for positioning internally within a drysuit and/or semi-drysuit; and
    (c) a flexible hose fixedly attached to and passed through walls of the adapter, the flexible hose having a mouthpiece connected to one end and an opposite end connected to an outlet of the fluid reservoir such that the flexible hose is configured to pass fluid from the fluid reservoir to the mouthpiece, wherein
    the adapter comprises:
       a main body having opposing inner and outer planar faces that are connected to one another by an outer circumferential wall and an inner circumferential wall positioned there between,
       the main body defining a first opening formed along the inner circumferential wall and the inner circumferential wall configured to securely mate with the pressurized gas regulator of the inflation valve assembly, and
       the main body comprising a second opening extending transversely through the main body from the outer circumferential wall through to the inner circumferential wall such that a flexible hose may passed through the first and second openings of the main body and securely attached within the second opening of the hollow main body so that liquids for consumption contained within the drysuit and/or semi-drysuit may be passed through the hollow main body via the flexible hose, and
       an elongate neck positioned directly on and extending away from the inner planar face of the hollow main body,
       the elongate neck defining an opening that is at least partially axially aligned and in fluid communication with the first opening of the hollow main body to allow pressurized gases to flow through the adapter into the drysuit and/or semi-drysuit, and
       the elongate neck is configured to securely engage the cap of the inflation valve assembly for attachment of the adapter to the drysuit and/or semi-drysuit.

11. A drysuit and/or semi-drysuit equipped with a hydration assembly thereon comprising:
    (a) the drysuit and/or semi-drysuit;
    (b) an inflation valve assembly securely fixed to the drysuit and/or semi-drysuit; the inflation valve assembly including a pressurized gas regulator and a cap;

(c) an adapter of the hydration assembly securely positioned on the drysuit and/or semi-drysuit and mated to the regulator and cap of the inflation valve assembly;

(d) a fluid reservoir of the hydration assembly positioned inside the drysuit and/or semi-drysuit; and (e) a flexible hose of the hydration assembly fixedly attached to and passed through the adapter, the flexible hose connected to a mouthpiece on one end and connected to an outlet of the fluid reservoir on an opposite end and being configured to pass fluid from the fluid reservoir to the mouthpiece, wherein the adapter comprises:

a main body having opposing inner and outer planar faces that are connected to one another by an outer circumferential wall and an inner circumferential wall positioned there between, the main body defining a first opening formed along the inner circumferential wall and the inner circumferential wall securely mated with the pressurized gas regulator of the inflation valve assembly, and the main body comprising a second opening extending transversely through the main body from the outer circumferential wall through to the inner circumferential wall such that a flexible hose passes through the first and second openings of the main body and is securely attached within the second opening of the hollow main body so that liquids for consumption contained within the fluid reservoir in the drysuit and/or semi-drysuit may be passed through the hollow main body via the flexible hose, and an elongate neck positioned directly on and extending away from the inner planar face of the hollow main body, the elongate neck defines an opening that is at least partially axially aligned and in fluid communication with the first opening of the hollow main body to allow pressurized gases to flow through the adapter into the drysuit and/or semi-drysuit, and the elongate neck securely engages the cap of the inflation valve assembly to securely attach the inflation valve assembly and adapter on the drysuit and/or semi-drysuit.

* * * * *